UNITED STATES PATENT OFFICE.

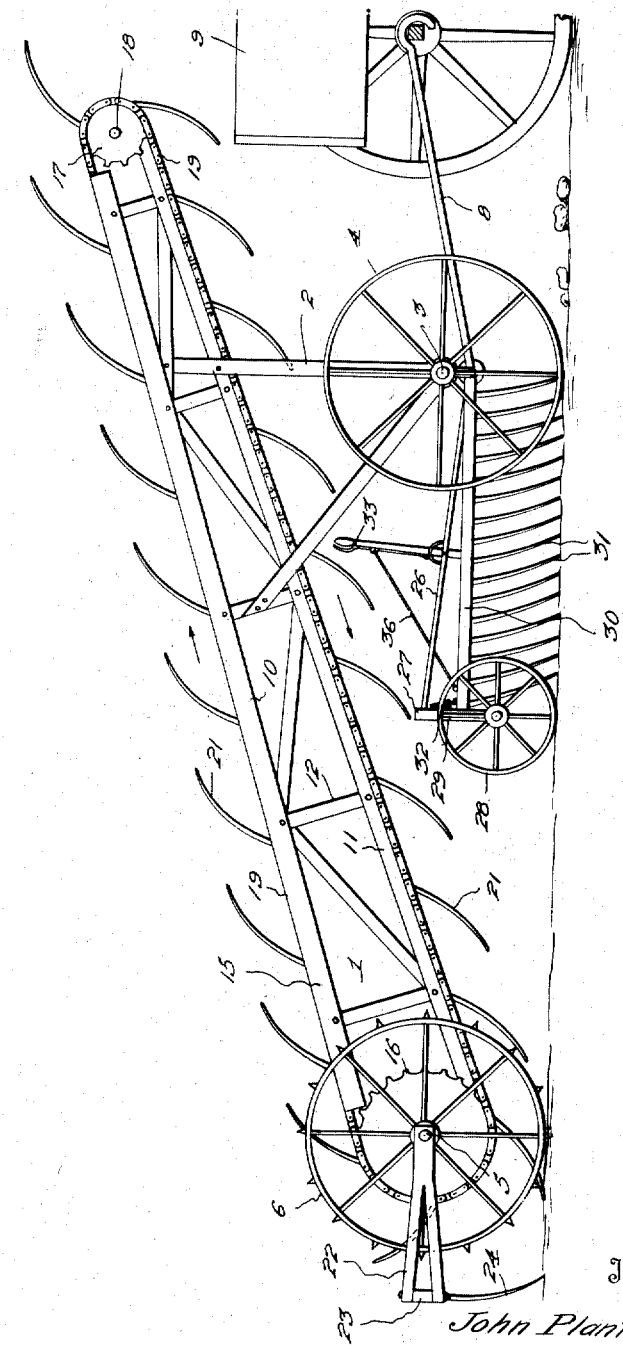

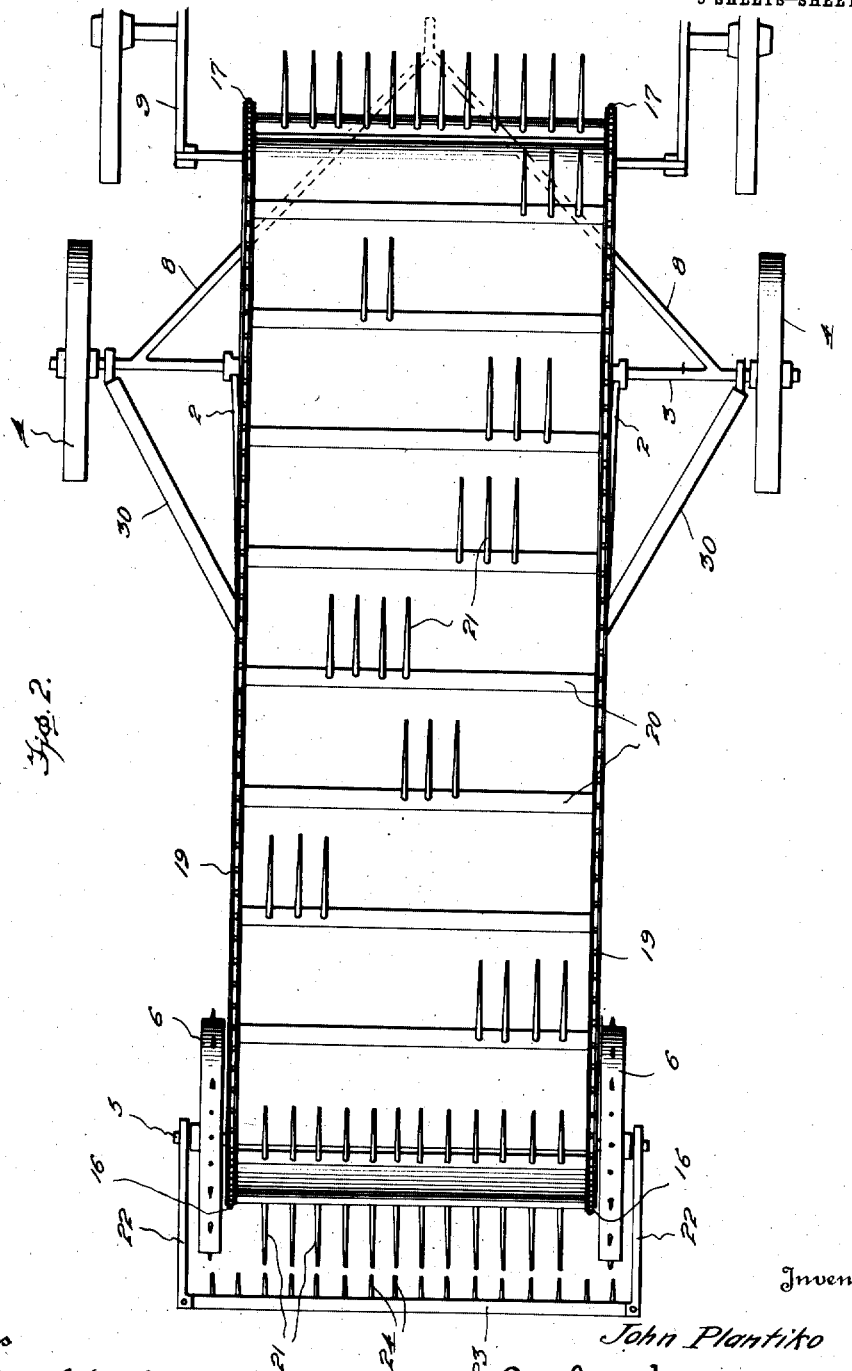

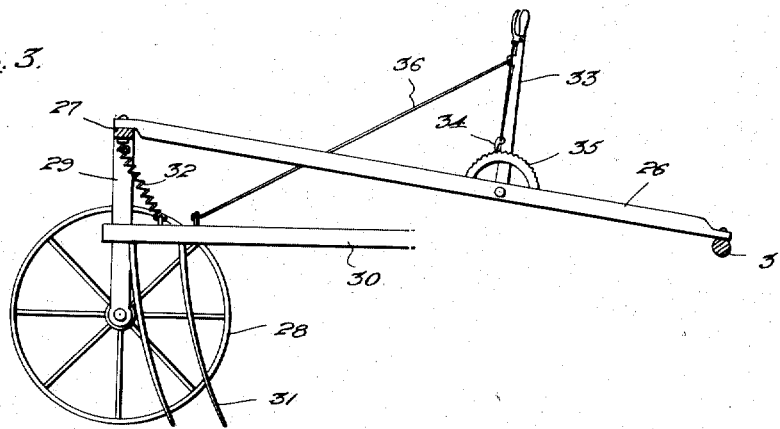
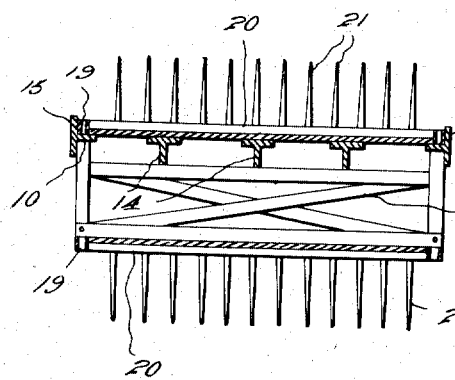
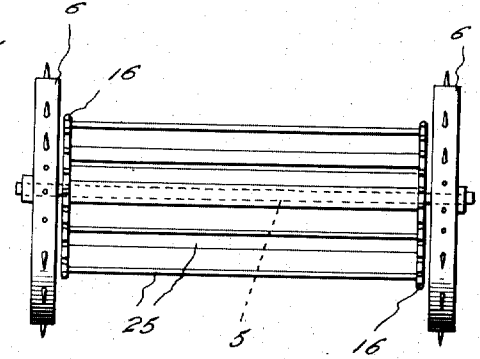

JOHN PLANTIKO, OF WITHEE, WISCONSIN.

STONE-GATHERER.

1,253,094.

Specification of Letters Patent.

Patented Jan. 8, 1918.

Application filed February 24, 1917. Serial No. 150,673.

*To all whom it may concern:*

Be it known that I, JOHN PLANTIKO, a citizen of the United States, residing at Withee, in the county of Clark and State of Wisconsin, have invented certain useful Improvements in Stone-Gatherers, of which the following is a specification, reference being had therein to the accompanying drawing.

The object of my invention is to provide an endless conveyer, provided with hooks or fingers, and mounted upon a suitable truck, and adapted to be connected to the rear of a wagon to load rocks and stones from the ground into the said wagon.

A further object of my invention is to provide raking means attached to the said truck, for drawing the rocks from each side of the truck into the path of the fingers upon the endless conveyer, so that the stones may be elevated to the wagon.

With these and other objects in view, my invention resides in the construction, combinations, and arrangement of parts to be hereinafter described and claimed, and illustrated in the accompanying drawings forming a part of this specification in which like reference characters indicate like parts throughout the several views.

Figure 1 is a side elevation of my improved machine in operative position.

Fig. 2 is a top plan view of the same.

Fig. 3 is an enlarged vertical section of the raking mechanism.

Fig. 4 is a transverse section of the endless conveyer and supporting frame.

Fig. 5 is a rear view of the drive wheels and associated parts of my improved machine.

In the drawings, the numeral 1 designates the frame for the endless conveyer, which is elevated at its front end upon side frames 2, carried by an axle 3 on which are mounted wheels 4. At its rear or lower end, the frame 1 is carried upon an axle 5, upon which are mounted the traction wheels 6. A tongue 8 is secured to the front axle 3 and is adapted to be hooked over the rear axle of a wagon 9, into which the stones are to be elevated.

The frame 1 for the endless conveyer, which is rectangular in cross section and of any convenient length, is formed of upper and lower corner irons 10 and 11 respectively, connected by cross irons 12, and braces 13. A series of longitudinally extending T irons 14, are disposed transversely of the top of the frame 1, their heads forming a support upon which the endless conveyer belt is adapted to run. The upper corner irons 10 are formed with a vertically extending flange 15 which prevents lateral displacement of the conveyer belt.

Sprocket wheels 16, connected by cross slats 25 forming a hollow drum, are secured to the inner side of each of the wheels 6, and a similar sprocket wheel 17 is loosely mounted upon each end of a shaft 18 extending transversely of the upper end of the frame 1. Endless sprocket chains 19 connect the upper and lower sprocket wheels at each side of the frame, and cross slats 20 upon which are secured the curved hooks or fingers 21, are connected at each end to the said sprocket chains, and extend across the frame and are adapted to slide upon the T irons 14.

Arms 22 suitably braced, are secured to each end of the axle 5, and extend rearwardly of the wheels 6 and are connected by a cross bar 23, from which project a series of rake teeth 24 adapted to engage the surface of the ground in rear of the wheels 6.

Extending rearwardly from the axle 3 is an upwardly sloping arm 26, upon the rear end of which is a cross arm 27. Supporting wheels 28 are journaled in the lower ends of arms 29 extending down from each end of the cross arm 27. Bars 30 provided with a series of rake teeth 31, are pivoted at each end of the axle 3, and extend inwardly and rearwardly to the cross bar 27, to which they are secured in spaced relation by coiled springs 32. A lever 33, provided with a locking pawl 34 and sector 35, is pivoted to the arm 26, and is connected with the rear end of each of the rake bars 30 by a wire 36, to lift the rake teeth 31 from engagement with the ground when so desired.

The operation of my machine is as follows: The tongue 8 secured to the front truck of the device, is fastened to the wagon 9 into which the stones are to be elevated, in such a manner that the upper or forward end of the conveyer is over the rear end of the wagon body as shown in Fig. 1. The wagon 9 followed by the stone gatherer is then driven over the ground occupied by the loose stones, and the rake teeth 31 having been dropped into engagement with the soil, through the lever 33, the stones will be raked in from either side to the center of the machine, the rake tooth bars being inwardly slanting as previously described.

As the machine is driven on, the stones now collected in a row beneath the center of the machine, are engaged by the hooks 21 upon the endless conveyer, moving in the direction indicated by the arrows in Fig. 1, being actuated through the sprocket wheels 16 connected to the traction wheels 6, and are carried up by the hooks 21 along the frame 1 and dumped into the wagon body beneath the upper end of the conveyer. The rake teeth 24 in rear of the lower or rear end of the conveyer, prevent the stones from being thrown back of the machine by the fingers 21 as they move around the drum 25.

It will thus be seen that I have provided a machine which may be readily attached to the rear of a wagon, and which will rake in, elevate, and dump into the wagon, all loose stones lying in the path of the same, which are larger than the spaces between the teeth 21.

I claim:—

1. The combination in a machine of the character specified of an endless conveyer supporting frame, traction wheels secured to each side of the rear of the said frame, side frames supporting the front end of the said frame in an elevated position, an axle having wheels mounted thereon connecting the lower ends of the said side frames, a rod extending rearwardly from the said axle and having a cross arm mounted thereon, wheels supporting the said cross arm, upwardly movable rake bars pivoted to each end of the said axle and extending inwardly to each end of the above mentioned cross arm, sprocket wheels secured to the above mentioned traction wheels, an endless belt having a sprocket chain secured to each edge thereof and adapted to revolve upon the above mentioned conveyer supporting frame with the said sprocket chains engaging the above mentioned sprocket wheels, outwardly extending fingers secured to the said endless belt, and a rake bar extending across the rear of the said machine in rear of the lower end of the said conveyer.

2. The combination in a machine of the character specified of a frame, an endless conveyer having ground engaging fingers mounted to revolve upon the said frame, wheeled trucks supporting the said frame so that its front end is in an elevated position, a rearwardly extending rod secured to the center of the front truck beneath the said frame and having a cross arm mounted thereon, wheels supporting the said cross arm, rake bars horizontally pivoted to each end of the said front trucks and extending inwardly to each end of the said cross arm, springs secured to the said cross arm and the inner ends of the said rake bars, and means for swinging the said rake bars upon their pivots and locking the same.

3. The combination in a machine of the character specified, of an endless conveyer supporting frame, wheeled trucks supporting the said frame with its front end in an elevated position, an endless conveyer having ground engaging fingers adapted to revolve upon the said frame, a rake bar extending across the rear of the said endless conveyer and inwardly sloping vertically movable rake bars secured to each side of the front supporting truck.

4. The combination in a machine of the character specified of an endless conveyer having ground engaging fingers, trucks supporting the said endless conveyer with its front end in an elevated position, and inwardly sloping ground engaging rake bars secured to each side of the front of the said machine.

5. The combination in a machine of the character specified of an endless conveyer having ground engaging fingers and elevated at its front end, an inwardly sloping ground engaging rake bar secured to each side of the front of the said machine and a transversely extending ground engaging rake bar in rear of the said endless conveyer.

In testimony whereof I affix my signature.

JOHN PLANTIKO.